(12) United States Patent
Slick

(10) Patent No.: US 10,972,520 B1
(45) Date of Patent: Apr. 6, 2021

(54) MONITOR MIXING SYSTEM THAT DISTRIBUTES REAL-TIME MULTICHANNEL AUDIO OVER A WIRELESS DIGITAL NETWORK

(71) Applicant: Audio Fusion Systems, Inc., Austin, TX (US)

(72) Inventor: Kevin R. Slick, Austin, TX (US)

(73) Assignee: Audio Fusion Systems, Inc., Austin, TX (US)

( * ) Notice: Subject to any disclaimer, the term of this patent is extended or adjusted under 35 U.S.C. 154(b) by 0 days.

(21) Appl. No.: 16/570,438

(22) Filed: Sep. 13, 2019

Related U.S. Application Data (62) Division of application No. 15/454,070, filed on Mar. 9, 2017, now Pat. No. 10,454,982.

(Continued)

(51) Int. Cl.
*H04L 29/06* (2006.01)
*G10L 19/00* (2013.01)
(Continued)

(52) U.S. Cl.
CPC .......... *H04L 65/4069* (2013.01); *G10L 19/00* (2013.01); *G10L 19/005* (2013.01); *G10L 19/008* (2013.01); *G10L 19/0017* (2013.01); *G10L 19/167* (2013.01); *H04L 65/602* (2013.01); *H04L 65/604* (2013.01);
(Continued)

(58) Field of Classification Search
CPC ..... G10L 19/00; G10L 19/005; G10L 19/008; G10L 19/0017; G10L 19/167; G10H 2240/011; G10H 2240/016; G10H 2240/175; G10H 2240/325; G10H 2250/631; G10H 2250/635; G10H 2250/545; H04L 65/602; H04L 65/604; H04L 65/605; H04L 65/607;
(Continued)

(56) References Cited

U.S. PATENT DOCUMENTS

| 7,088,774 B1 | 8/2006 | Moni et al. |
| 7,447,172 B2 | 11/2008 | Matsumoto |

(Continued)

FOREIGN PATENT DOCUMENTS

CN          102810314 A * 12/2012 ........... G10L 19/005

OTHER PUBLICATIONS

Rishi Sinha et al. "Loss Concealment for Multi-Channel Streaming Audio", NOSSDAV'03, Jun. 1-3, 2003, Monterey, California, USA, 10 pages. (Year: 2003).*

(Continued)

*Primary Examiner* — George C Neurauter, Jr.
(74) *Attorney, Agent, or Firm* — Kowert, Hood, Munyon, Rankin & Goetzel, P.C.; Lawrence J. Merkel (57) ABSTRACT

In an embodiment, a wireless mix monitor system is provided in which the musicians have one or more wearable electronic devices that may receive digital audio over a wireless connection to a computer. The channels monitored by a given user may be mixed on the computer, on the devices, or on a combination of the computer and the devices. The musicians may be freed from a fixed mix monitor, allowing easy movement about the stage or performance space. Audio buffering and upsampling/downsampling may be used to manage temporal discontinuities in the audio stream.

20 Claims, 5 Drawing Sheets

Related U.S. Application Data (60) Provisional application No. 62/310,661, filed on Mar. 18, 2016.

(51) Int. Cl.
    *H04R 27/00* (2006.01)
    *G10L 19/16* (2013.01)
    *G10L 19/005* (2013.01)
    *G10L 19/008* (2013.01)
    *H04W 84/12* (2009.01)

(52) U.S. Cl.
    CPC .......... *H04L 65/605* (2013.01); *H04L 65/607* (2013.01); *H04R 27/00* (2013.01); *G10H 2240/011* (2013.01); *G10H 2240/016* (2013.01); *G10H 2240/175* (2013.01); *G10H 2240/325* (2013.01); *G10H 2250/631* (2013.01); *H04R 2227/003* (2013.01); *H04S 2400/01* (2013.01); *H04W 84/12* (2013.01)

(58) Field of Classification Search
    CPC ................ H04L 65/4069; H04R 27/00; H04R 2227/003; H04S 2400/01; H04W 84/12
    See application file for complete search history.

(56) References Cited

U.S. PATENT DOCUMENTS

| | | | |
|---|---|---|---|
| 7,738,613 B1 | 6/2010 | Andersen et al. | |
| 8,015,306 B2 | 9/2011 | Bowman | |
| 8,321,593 B2 | 11/2012 | Bushell et al. | |
| 8,375,137 B2 | 2/2013 | Bowman | |
| 8,582,565 B1 | 11/2013 | Morsy | |
| 8,639,830 B2 | 1/2014 | Bowman | |
| 8,774,172 B2 | 7/2014 | Morsy et al. | |
| 8,837,529 B2* | 9/2014 | LaBosco | H04J 3/02 370/498 |
| 9,202,509 B2 | 12/2015 | Kallai et al. | |
| 9,237,324 B2 | 1/2016 | Lee et al. | |
| 9,300,919 B2 | 3/2016 | Cholas | |
| 9,661,043 B2 | 5/2017 | Walker et al. | |
| 9,819,448 B2* | 11/2017 | Koenig | H04L 1/0084 |
| 9,860,588 B2 | 1/2018 | Risberg et al. | |
| 10,001,968 B1 | 6/2018 | Slick | |
| 10,003,901 B1 | 6/2018 | Slick | |
| 10,009,413 B2 | 6/2018 | Wohlert et al. | |
| 10,028,057 B2* | 7/2018 | Filippini | H04S 3/008 |
| 10,063,333 B2* | 8/2018 | Hayasaka | H04R 3/04 |
| 10,341,773 B2* | 7/2019 | Filippini | H04W 56/0015 |
| 10,587,954 B2* | 3/2020 | Filippini | H04R 3/12 |
| 2003/0161324 A1* | 8/2003 | Clemens | H04H 60/11 370/395.42 |
| 2005/0002402 A1 | 1/2005 | Fairman | |
| 2005/0105471 A1 | 5/2005 | Ido et al. | |
| 2006/0018257 A1 | 1/2006 | Seo | |
| 2006/0023706 A1 | 2/2006 | Varma et al. | |
| 2006/0181436 A1* | 8/2006 | Moriya | H03M 7/24 341/50 |
| 2007/0081562 A1 | 4/2007 | Ma | |
| 2008/0259966 A1 | 10/2008 | Baird | |
| 2009/0059962 A1 | 3/2009 | Schmidt | |
| 2009/0204413 A1* | 8/2009 | Sintes | G06F 3/165 704/500 |
| 2010/0023638 A1 | 1/2010 | Bowman | |
| 2012/0050456 A1 | 3/2012 | Arnao | |
| 2012/0324520 A1 | 12/2012 | Van Deventer | |
| 2013/0184842 A1* | 7/2013 | Mora | H04L 49/901 700/94 |
| 2014/0072000 A1* | 3/2014 | Shiva | H04L 47/283 370/516 |
| 2014/0181273 A1 | 6/2014 | Kondo | |
| 2015/0078372 A1* | 3/2015 | Mani | H04L 1/08 370/352 |
| 2015/0249468 A1* | 9/2015 | Nikkila | G10L 19/008 714/746 |
| 2015/0256473 A1 | 9/2015 | Walker et al. | |
| 2017/0125027 A1* | 5/2017 | Filippini | H04S 3/008 |

OTHER PUBLICATIONS

Benjamin W. Wah et al. "A Survey of Error-Concealment Schemes for Real-Time Audio and Video Transmissions over the Internet", IEEE International Symposium on Multimedia Software Engineering, Dec. 2000, 8 pages. (Year: 2000).*

J. Lennox et al. "Sending Multiple Media Streams in a Single RTP Session: Grouping RTCP Reception Statistics and Other Feedback", AVTCORE WG, Internet-Draft, draft-ietf-avtcore-rtp-multi-stream-optimisation-09, Nov. 24, 2015, 17 pages. (Year: 2015).*

J. Lennox et al. "Sending Multiple RTP Streams in a Single RTP Session", AVTCORE, Internet-Draft, draft-ietf-avtcore-rtp-multi-stream-11, Dec. 11, 2015, 27 pages. (Year: 2015).*

How to Audiofetch ; http://www.audiofetch.com:80/about/how-it-works/; May 2017; 3 -ages.

What is Audiovero; http:www.audivero.com:80/what-audivero; Dec. 6, 2013-Nov. 15, 2015, 2 pages.

H.Schulzrinne, Columbia University, S. Casner, Packet Design, R. Frederick, Blue Coat Systems Inc., V. Jacobson, Packet Design, RTP: A Transport Protocol for Real_Time Applications; Jul. 2003, 89 pages. H. Schulzrinne et al. "Request for Comments (RFC) 3550: RTP: A Transport Protocol for Real-Time Applications", Network Working Group, Jul. 2003, 89 pages. (Year: 2003).

Christoffer Lauri and Johan Malmgren. "Synchronization of streamed audio between multiple playback devices over an unmanaged IP network", Department of Electrical and Information Technology, Faculty of Engineering, LTH, Lund University, Sweden, Sep. 2015, 89 pages. (Year: 2015).

Ray Alfano. "Real-Time High Fidelity Audio for Networked Music Performance", Computer Science Program, California State University Channel Islands, May 2014, 59 pages. (Year: 2014).

Roger Zimmermann, Elaine Chew, Sakire Arslan Ay, and Moses Pawar. "Distributed Musical Performances: Architecture and Stream Management", University of Southern California, May 2008, 23 pages. (Year: 2008).

Chrisoula Alexandraki. "Real-time Machine Listening and Segmental Re-synthesis for Networked Music Performance", Hamburg University, Germany, Nov. 2014, 238 pages. (Year: 2014).

H. Schulzrinne et al. "Request for Comments (RFC) 2326: Real Time Streaming Protocol (RTSP)", Network Working Group, Apr. 1998, 92 pages. (Year: 1998).

Jinyong Jo and JongWon Kim. "Synchronized one-to-many media streaming with adaptive playout control", Department of Information and Communications, Kwang-Ju Institute of Science and Technology, Korea, 2002, 11 pages. (Year: 2002).

* cited by examiner

MONITOR MIXING SYSTEM THAT DISTRIBUTES REAL-TIME MULTICHANNEL AUDIO OVER A WIRELESS DIGITAL NETWORK

This application is a division of U.S. patent application Ser. No. 15/454,070, filed on Mar. 9, 2017 and now U.S. Pat. No. 10,454,982, which claims benefit of priority to U.S. Provisional Patent Application Ser. No. 62/310,661, filed on Mar. 18, 2016. The above applications are incorporated herein by reference in their entireties. To the extent that anything in the above applications conflict with material expressly set forth herein, the material expressly set forth herein controls.

BACKGROUND

Technical Field

Embodiments described herein are related to electronic devices in a music monitor system for mixing music channels for a musician participating in the performance of the music.

Description of the Related Art

When performing live music, the musicians in a band generally need to be able to hear the music they are producing. In an amplified music environment such as a concert hall, the music is being projected to the audience from an area generally in front of the musicians (and possibly to either side), which prevents the musicians from hearing the music effectively. Similarly, when recording music or other scenarios, the musicians need to be able to hear the music in "real time."

Typical music monitors include one of two types: fixed mixers that are connected to speakers in front of the musicians and facing the musicians, or fixed mixers connected to a wired earphone. In either case, the musician's ability to move about the stage is restricted by needing to remain near the musician's speaker or mixer.

SUMMARY

In an embodiment, a wireless mix monitor system is provided in which the musicians have one or more wearable electronic devices that may receive digital audio over a wireless connection to a computer. The channels monitored by a given user may be mixed on the computer, on the devices, or on a combination of the computer and the devices. The musicians may be freed from a fixed mix monitor, allowing easy movement about the stage or performance space. Audio buffering and upsampling/downsampling may be used to manage temporal discontinuities in the audio stream.

BRIEF DESCRIPTION OF THE DRAWINGS

The following detailed description makes reference to the accompanying drawings, which are now briefly described.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

Figure 1:
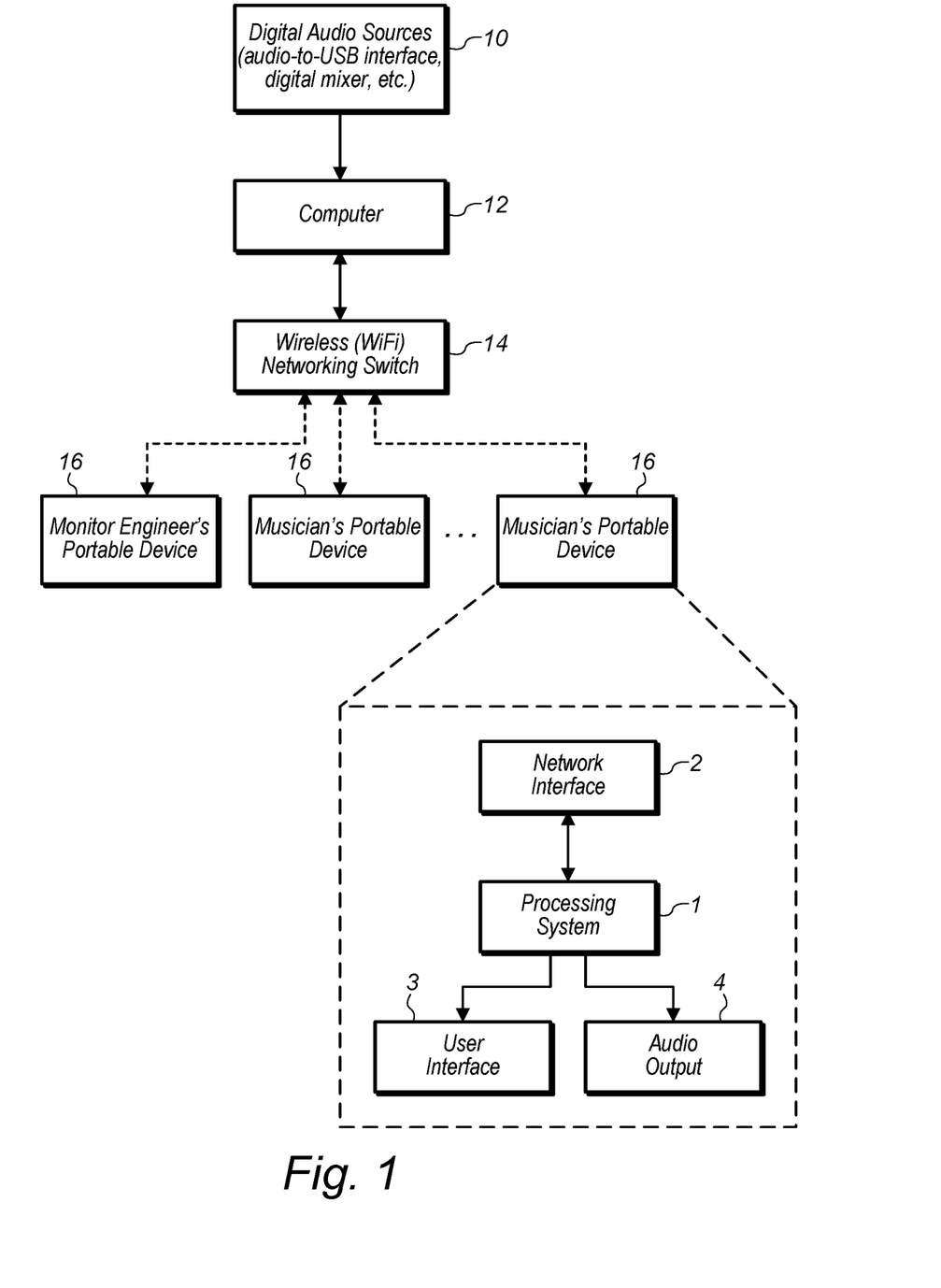
FIG. 1 is a block diagram of one embodiment of a system for providing personalized audio mixes—often referred to as "monitor mixes"—to each musician via a wireless network during a performance or recording session.

FIG. 1 is a block diagram of one embodiment of a system for providing personalized audio mixes to each musician during a performance, rehearsal, recording session, etc.

Each digital audio source 10 may provide a multichannel, digital audio stream to the computer 12, by connecting to one of the computer's digital inputs: USB, Firewire, Ethernet, etc. The digital audio sources 10 may include any sort of analog-to-digital converter, digital mixer, or other digital equipment that receives inputs from the band's instruments, microphones, recordings, etc. and provides multichannel digital audio output.

The computer 12 may combine the audio streams from the digital audio source(s) 10 and send them in packets to the wireless networking switch 14, which may then transmit them to each of the monitor engineer's and musicians' portable devices 16. Any type of computer 12 may be used (e.g. a laptop or desktop computer).

The computer 12 may send and receive configuration and control messages to and from the portable devices 16 via the wireless networking switch 14. These messages may be used to configure and control the transmission and processing of the digital audio streams. For example, the portable devices 16 may report the buffering requirements (size, format, etc.) of their internal audio players so that the computer 12 may optimize the digital audio stream for each of them, offloading some or all of the processing burden from those devices. As another example, the portable devices 16 may allow the monitor engineer or musicians to configure the labeling of each of the digital audio channels, for display on all of the connected devices 16.

The wireless networking switch 14 may be connected using any networking technology—such as Ethernet, WiFi, or a combination—to the computer 12 and to each of the monitor engineer's and musicians' portable devices 16. If WiFi is used, any of the WiFi technology standards—such as 802.11n or 802.11ac—may be used.

The monitor engineer's and musicians' portable devices 16 may mix the multiple channels of audio into a stereo stream, and then play the stereo audio for the monitor engineer or musician via the device's internal audio player.

The user (musician) may listen to the audio from the audio output (e.g., headphone jack) of the musician's portable device 16. A wired headphone may be used, or a wireless headphone connected to the mobile device using various wireless standards such as Bluetooth may be used. The musician's portable devices 16 may be any type of portable device that has standard digital networking capability and an audio output. The device 16 may include wearable mobile devices that may be attached to the user/musician or carried on or by the user/musician, such as smart devices. Smart devices may include, for example, personal digital assistants such as the iPod™, iPhone™, or Android devices. Smart devices may also include non-wearable devices such as and iPad™ or other tablet devices. The musician's portable devices 16 may also include laptop computers which may be arranged near the user/musician to permit manipulation of settings by the user/musician. The musician's portable devices 16 may also include specialized hardware designed for the purpose of monitor mixing. A musician's portable device 16 may be any device which is capable of operation without a direct connection to a wall outlet (e.g. on battery power drawn from a battery within the device), even though the device may be plugged in during use at some points.

The musician's portable device 16 may include one or more processors that may be configured to execute code, including an operating system and/or various application programs such as the programs described below. The processors and a memory system storing the code/data executed by the processor may be referred to as a processing system. The device may also include a display on which the user interfaces may be displayed and from which input may be accepted. For example, the display may be a touchscreen display that may be configured to display images generated by the device and that may be configured to detect user touches on the screen. The touchscreen may convey position and/or movement information to the device. Customized hardware devices used as the musician's portable device 16 may include physical input/output hardwire (e.g. knobs, switches, sliders, etc.). Generally, the display and user input hardware may be referred to as a user input/output interface. One of the musician's portable devices 16 in FIG. 1 is shown in exploded view to include the processing system 1, the network interface 2 to receive the multi-channel audio over the network, the user input/output interface 3, and the audio output 4. The processing system 1 is coupled to the network interface 2, the user input/output interface 3, and the audio output 4.

The musician's portable device 16 may further include WiFi circuitry configured to transmit and receive WiFi data packets, including the stream of digital audio packets transmitted by the computer 12. The mobile device 16 may still further include an audio system configured to play a stream of audio output from the audio engine mixer described below (e.g. output to a headphone jack, on a speaker in the mobile device, etc.). Generally, the components of the device may be coupled together (e.g. the WiFi circuitry, the user input/output interface, the processing system, and the audio system).

Figure 2:
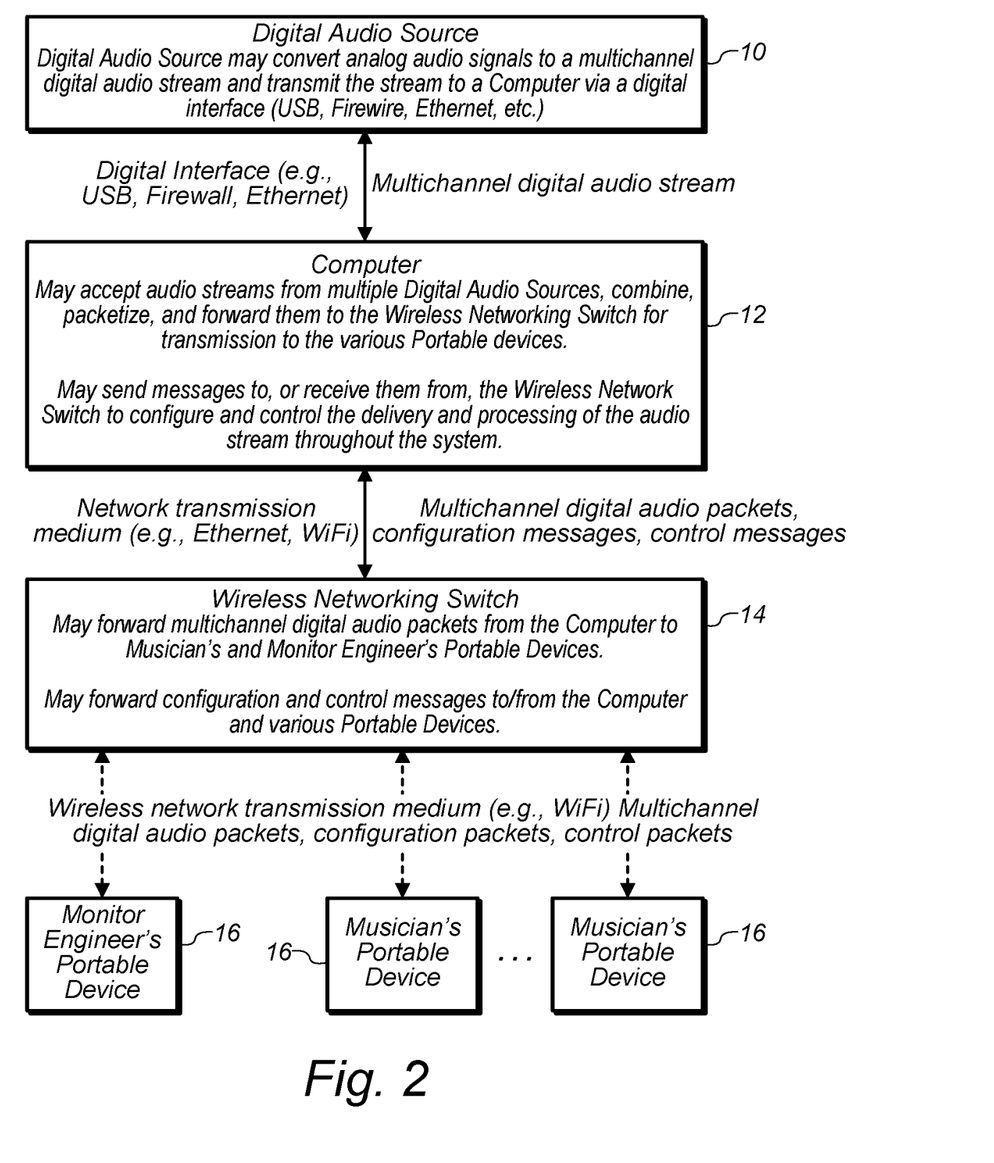
FIG. 2 is a flowchart illustrating one embodiment of the flow of multichannel digital audio packets, configuration messages, and control messages in a monitor mixing system.

FIG. 2 is a diagram to illustrate one embodiment of the flow of digital audio through a wireless monitor mixing system.

Each digital audio source 10 may be configured to use the least amount of buffering possible, to minimize overall audio latency. The buffer configuration may be a setting available on the digital audio source 10, and may be set the lowest amount of buffering supported by the digital audio source 10.

The computer 12 may accept multichannel digital audio streams from multiple digital audio sources 10 and combine them into packets of audio data suitable for low-latency transmission via modern computer networking media (e.g., Ethernet, WiFi) to a networking switch and, ultimately, to musicians' portable devices 16 and the monitor engineer's portable device 16 (see below).

The computer 12 may also send configuration and control messages to configure mix channels (e.g., labeling, stream channel assignments) and to control mix parameters (e.g., volume levels) and audio stream characteristics (e.g., buffering, timing).

Buffering by the computer 12 may be kept to a minimum to prevent adding unnecessary latency to the overall audio transit time, thereby helping to minimize overall capture-to-playback audio latency.

The computer 12 may format the samples in the packets in ways that help minimize the impact of lost packets. For example, the samples may be interleaved across packets, so that, in the event of a packet getting dropped during transmission, the portable device 12 may reconstruct the audio, albeit in a possibly degraded form. More specifically, for example, even-numbered samples may be included in one packet and odd-numbered samples in another packet. If either packet is lost, the original signal may still be reconstructed (at half the sample rate) with the packet that was not lost. There are many kinds of techniques that may be used to conceal the loss of samples, and any such technique may be used in various embodiments, or combinations of techniques may be used in various embodiments. The computer 12 may encrypt the audio packets to protect against piracy and provide system security. Any standard computer networking encryption method may be used.

The computer 12 may create audio packets that are as small as possible, containing no more samples than necessary, in order to minimize latency and the impact of lost packets. Any size packet and number of samples/packet may be used in various embodiments, and there is no minimum size requirement. Ideally, however, the packets may contain audio buffers whose sizes are an even divisor of the minimum audio rendering buffer size configurable in the portable devices 16. For example, if the smallest rendering buffer size configurable on all of the portable devices 16 is 64 samples, the computer 16 may create audio packets containing audio buffers of 64, 32, 16, etc.

The computer 12 may employ any of the standard networking protocols, such as Transmission Control Protocol/Internet Protocol (TCP/IP), to take advantage of the robustness and quality of service such standards are designed to provide.

The computer 12 may monitor the wireless interference, such as WiFi channel usage, and report this information to aid users in configuring the wireless networking switch 14 to minimize (radio) interference.

The wireless networking switch 14 may forward multi-channel digital audio packets from the computer 12 to the musicians' portable devices 16 and the monitor engineer's portable device 16, using WiFi or similar wireless networking medium.

The wireless networking switch 14 may forward configuration and control packets to/from the computer 12, the musicians' portable devices 16 and the monitor engineer's portable device 16.

The wireless networking switch 14 may be dedicated exclusively to use in the wireless monitor mixing system, to avoid unrelated congestion and interference, and thereby minimize packet loss and latency due to transmission delays.

The wireless networking switch 14 may be configured to use a radio channel that is otherwise unused in the performance location, studio, etc., to avoid interference and thereby minimize packet loss and latency.

Figure 3:
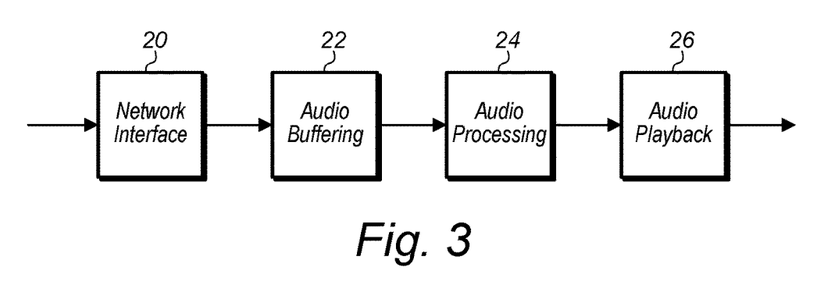
FIG. 3 is an illustration of one embodiment of audio processing for both the musician's portable device and the monitor engineer's portable device.

FIG. 3 is an illustration of one embodiment of audio processing for both the musician's portable device 16 and the monitor engineer's portable device 16.

The network interface 20 may be an industry standard computer-style wireless network communications interface, such as based on IEEE "WiFi" standards in the 802.11 series.

Audio may be buffered in each portable device 16 to compensate for jitter—caused by timing differences, interference, etc.—and thereby ensure continuity (no gap-outs) in the audio. The amount of audio buffering 22 may be kept to the minimum amount required to compensate for jitter, thereby minimizing the amount of playback latency contributed by the buffering. See FIG. 4 for an illustrated example.

In addition to typical audio processing such as mixing, equalization, and effects, the audio processing 24 may include resampling to keep the audio playback synchronized with the digital audio source's capture rate. Otherwise, over time the player's timing may drift from the digital audio source's timing, causing noise in the audio or possibly an audible delay between the portable devices 16. Since the system is wireless, the portable devices 16 have no wired connection and therefore no electrical signaling from the other system components with which they can synchronize their playback rate. Playback may be performed from the processed audio (block 26).

Figure 4:
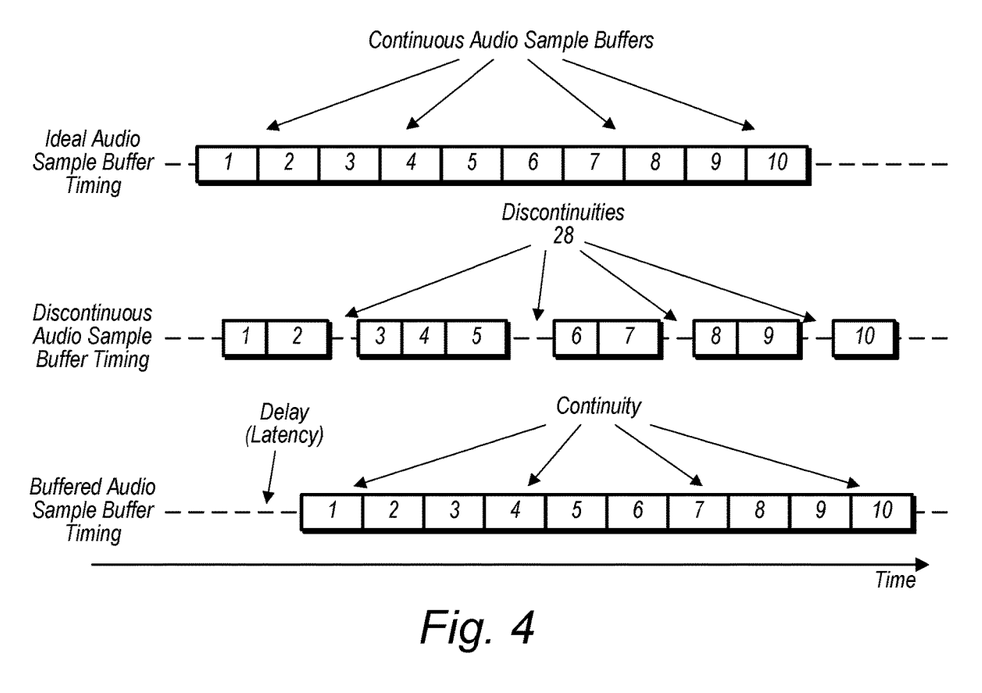
FIG. 4 is a flowchart illustrating operation of one embodiment of audio buffering.

FIG. 4 is a diagram illustrating operation of one embodiment of audio buffering.

Digital audio streams are susceptible to being delayed which causes "bunching" and discontinuities (gaps) 28 in the flow of the audio samples. Therefore, this effect can happen at several points in the flow of audio samples through the wireless monitor mixing system:

When audio is converted from analog to digital by a digital audio source 10.

When digital audio is transferred from a digital audio source 10 to the computer 12 input.

As the computer 12 processes the digital audio.

When the computer 12 transmits the digital audio to the wireless networking switch 14.

When the wireless networking switch 14 routes and transmits the digital audio to the portable devices 16.

When a portable device 16 receives, processes, and plays the digital audio.

The portable devices 16 may employ buffering of audio samples to maintain audio continuity and maintain a pool of samples for making timing adjustments, adding delay and other effects, etc. Buffering levels may be determined at run-time through continuous level monitoring and a periodic calibration process (see below under ongoing calibration and training). Buffering levels may be maintained by continual adjustment of the incoming audio sample timing to match the portable device's audio playback rate. See below.

Figure 5:
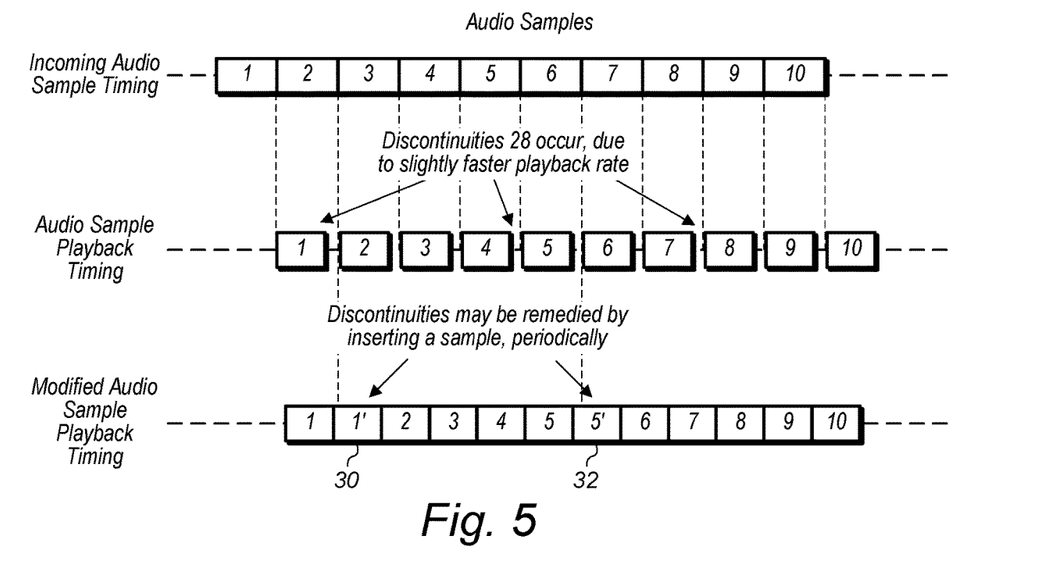
FIG. 5 and FIG. 6 are each diagrams illustrating operation of one embodiment of audio resampling.
Figure 6:
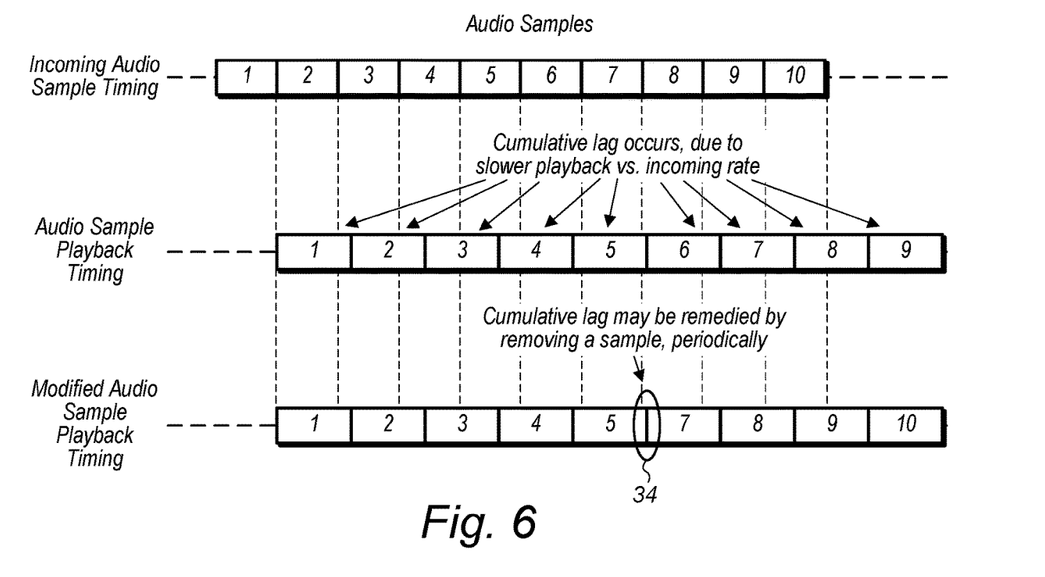

FIGS. 5 and 6 are diagrams illustrating operation of one embodiment of audio playback synchronization by altering, or "resampling", the incoming digital audio stream.

Resampling is a technique for sample rate conversion that generally involves adding or removing samples to change the apparent sample rate of a digital audio stream.

The portable devices 16 may employ resampling to cause the incoming audio sample delivery rate to match the actual playback rate of the internal audio player, to maintain long-term audio continuity and playback synchronization with the digital audio sources and each of the other portable devices 16.

The portable device 16 may continually check for synchronization by calculating and comparing the average rate of delivery of the incoming digital audio stream and the average playback rate of the portable device's internal audio player.

To match the incoming audio stream sample rate with the playback rate of an audio player that is playing faster than the incoming transfer rate, the portable device 16 may periodically add samples to, or "upsample", the audio stream, as depicted in FIG. 5 (Up samples 1' and 5', reference numerals 30 and 32). The added samples 30 and 32 may be a copy of the previous sample or the next sample. Alternatively, the added sample may be an interpolation between the previous sample and the next sample, or a combination of multiple samples. Alternatively, the added sample may be a 0 value, but would then require the sample set to be low-pass filtered.

Conversely, removal of samples, or "downsampling", may be used to match the incoming stream to a slower audio playback rate, as depicted in FIG. 6 (removal of sample 6, reference numeral 34).

Figure 7:
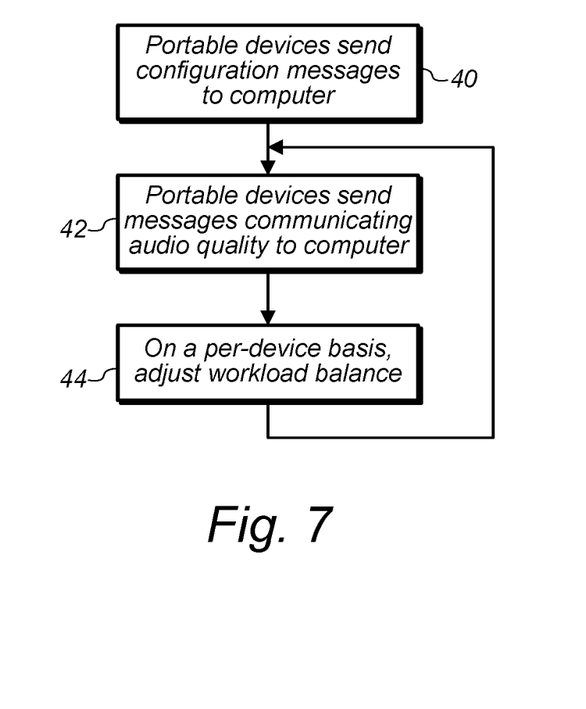
FIG. 7 is a flowchart illustrating one embodiment of ongoing calibration and training.

The wireless monitor mixing system may employ a continual calibration and training process to inform and adjust capture, transmission, processing, and playback buffering and effective rates. FIG. 7 is a flowchart illustrating such operation, for an embodiment The portable devices 16 may send configuration messages to the computer 12 to communicate preferred buffer size, sample rate, sample format (e.g., 16-bit integer vs. 32-bit floating point), and buffer format (e.g., interleaved vs. non-interleaved) (block 40).

Periodically during operation, the portable devices 16 may send messages to the computer 12 to communicate quality statistics of audio reception (block 42). Examples of these messages are gap-outs (audio discontinuities), over-runs (buffering more than necessary), and missed packets.

The computer 12 may use messages sent by the portable devices 16 to make decisions regarding amount of preprocessing to do on behalf of each portable device 16 before sending audio (block 44). That is, the preprocessing may be performed on a portable device by portable device basis. This may off-load some of the processing workload from the portable devices 16, which may generally have lesser compute power than the computer 12, by optimizing the audio stream for each portable device 16.

Examples of types of preprocessing the computer 12 may do on behalf of the portable devices 16 are mixing, sub-mixing, sample format conversion, sample rate conversion, sample buffer format conversion, and sample buffer resizing.

The computer 12 may employ algorithms to decide, case-by-case, to take on none, some, or all of the preprocessing tasks listed above. The decisions may be made based on whether each portable device 16 appears to be able to handle all of the processing itself, based on the statistical message being received from each portable device 16.

For example, the computer 12 may choose to perform audio sample rate conversion for one or more portable devices 16 that have indicated (via messaging) to the computer 12 that they use a native audio playback sample rate that is different from the sample rate being created by the digital audio source(s) 10. This would help ensure that the portable devices 16 don't suffer buffer overruns, bunching, or other side-effects of not being able to keep up with processing the digital audio stream.

The computer 12 may also be directed by the user (monitor engineer, etc.) to provide processing off-loading for the portable devices 16. That is, the user may be presented with one or more options for configuring the workload balance between the computer 12 and the portable devices 16. A good example of this is sub-mixing (creating a mix of a subset of related audio channels, such as a vocal ensemble, a horn section, or a drum kit), which is a logical processing task to centralize in one device, rather than requiring every portable device 16 to perform it for themselves.

Besides assisting the portable devices 16 with producing good audio quality, the computer's 12 off-loading of tasks can help extend battery life on those devices 16, by lowering their overall CPU and network utilization, which reduces power consumption.

The computer 12 may also use messages sent by the portable devices 16 to provide diagnostic and troubleshooting information to the monitor engineer, etc., in the event that audio quality problems exist.

Figure 8:
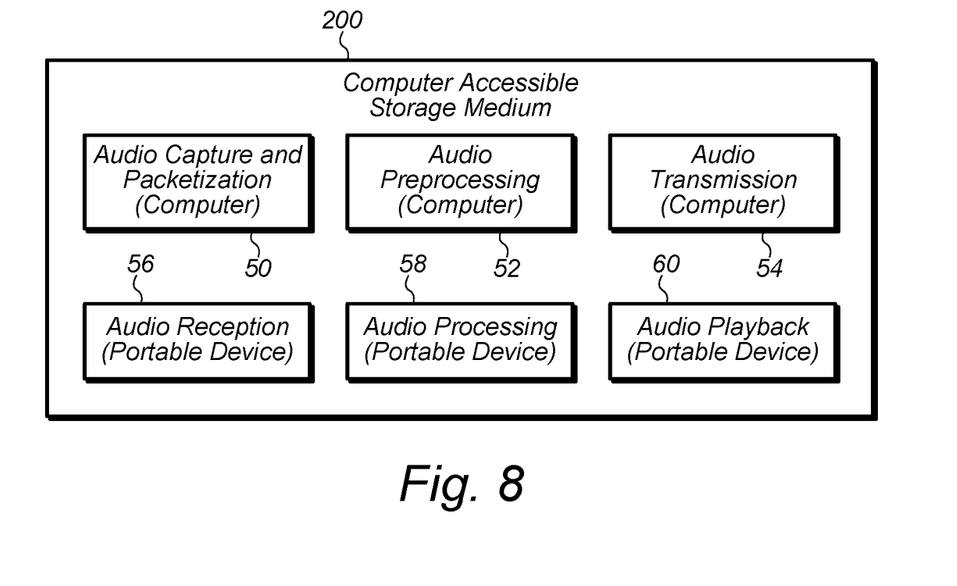
FIG. 8 is a block diagram of one embodiment of a computer accessible storage medium.

FIG. 8 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

In the context of FIG. 8, the computer may be the WiFi enabled mobile device in some cases (e.g. the portable devices 16). In such embodiments, the computer accessible storage medium 200 may be, for example, Flash memory and/or RAM in the device. Other mobile devices may include various optical or magnetic storage media. For example, when the computer is the computer 12 shown in FIGS. 1 and 2, the media may include optical or magnetic media as discussed above, or other media including Flash memory and/or RAM.

The computer accessible storage medium 200 in FIG. 8 may store one or more of audio capture and packetization 50, audio preprocessing 52, audio transmission 54, audio reception 56, audio processing 58, and audio playback 60 as described above. Audio capture and packetization 50, audio preprocessing 52, and audio transmission 54 may be software modules implemented on the computer 12, in an embodiment. Audio reception 56, audio processing 58, and audio playback 60 may be software modules implemented on the portable device(s) 16, in one embodiment. The software modules may comprise instructions which, when executed on the computer 12/portable device 16, may implement the operation described above for each module.

Numerous variations and modifications will become apparent to those skilled in the art once the above disclosure is fully appreciated. It is intended that the following claims be interpreted to embrace all such variations and modifications.

What is claimed is:

1. A non-transitory computer accessible storage medium storing a plurality of instructions which, when executed, cause a device to:
   receive messages from one or more portable devices reporting configuration and audio reception statistics;
   preprocess a multi-channel digital audio stream for each of the one or more portable devices on a per-portable-device basis responsive to the messages, wherein the preprocessing comprises off-loading at least one task that a given portable device was previously performing, and wherein the device is a central source for the multi-channel digital audio streams for the one or more portable devices; and
   packetize the preprocessed multi-channel digital audio stream for wireless transmission to the one or more portable devices used by one or more musicians in a live performance, wherein the multi-channel digital audio stream is derived from a plurality of digital audio sources corresponding to the one or more musicians during the live performance.

2. The non-transitory computer accessible storage medium as recited in claim 1 wherein the at least one task comprises conversion of a sample format of a plurality of samples in the multi-channel digital audio stream.

3. The non-transitory computer accessible storage medium as recited in claim 1 wherein the at least one task comprises sample buffer format conversion.

4. The non-transitory computer accessible storage medium as recited in claim 1 wherein the at least one task comprises buffer size matching.

5. The non-transitory computer accessible storage medium as recited in claim 1 wherein the at least one task comprises sample rate conversion.

6. The non-transitory computer accessible storage medium as recited in claim 1 wherein packetizing the preprocessed multi-channel digital audio stream comprises interleaving samples from a given channel of the multi-channel digital audio stream across multiple packets to provide redundancy in case of packet loss.

7. The non-transitory computer accessible storage medium as recited in claim 1 wherein at least one first task is off-loaded from a first portable device of the one or more portable devices and at least one second task is off-loaded from a second portable device of the one or more portable devices, wherein the at least one first task is different from the at least one second task.

8. A method comprising:
   receiving messages from one or more portable devices reporting configuration and audio reception statistics;
   preprocessing a multi-channel digital audio stream for each of the one or more portable devices on a per-portable-device basis responsive to the messages, wherein the preprocessing comprises off-loading at least one task that a given portable device was previously performing, wherein the preprocessing is performed on a device that is a central source for the multi-channel digital audio streams for the one or more portable devices; and
   packetizing the preprocessed multi-channel digital audio stream for wireless transmission to the one or more portable devices used by one or more musicians in a live performance, wherein the multi-channel digital audio stream is derived from a plurality of digital audio sources corresponding to the one or more musicians during the live performance; and
   wirelessly transmitting the packetized, preprocessed multi-channel digital audio stream to the one or more portable devices.

9. The method as recited in claim 8 wherein the at least one task comprises conversion of a sample format of a plurality of samples in the multi-channel digital audio stream.

10. The method as recited in claim 8 wherein the at least one task comprises sample buffer format conversion.

11. The method as recited in claim 8 wherein the at least one task comprises buffer size matching.

12. The method as recited in claim 8 wherein the at least one task comprises sample rate conversion.

13. The method as recited in claim 8 wherein packetizing the preprocessed multi-channel digital audio stream comprises interleaving samples from a given channel of the multi-channel digital audio stream across multiple packets to provide redundancy in case of packet loss.

14. The method as recited in claim 8 wherein at least one first task is off-loaded from a first portable device of the one or more portable devices and at least one second task is off-loaded from a second portable device of the one or more portable devices, wherein the at least one first task is different from the at least one second task.

15. A non-transitory computer accessible storage medium storing a plurality of instructions which, when executed, cause a device to:
   receive messages from one or more portable devices reporting configuration and audio reception statistics;
   preprocess a multi-channel digital audio stream for each of the one or more portable devices on a per-portable-device basis responsive to the messages, wherein the preprocessing comprises off-loading at least one first task that a first portable device was previously performing and off-loading at least one second task that a second portable device was previously performing, wherein the at least one first task is different from the at least one second task, and wherein the device is a central source for the multi-channel digital audio streams for the one or more portable devices; and packetize the preprocessed multi-channel digital audio stream for wireless transmission to the one or more portable devices used by one or more musicians in a live performance, wherein the multi-channel digital audio stream is derived from a plurality of digital audio sources corresponding to the one or more musicians during the live performance.

16. The non-transitory computer accessible storage medium as recited in claim 15 wherein the at least one first task comprises conversion of a sample format of a plurality of samples in the multi-channel digital audio stream.

17. The non-transitory computer accessible storage medium as recited in claim 15 wherein the at least first one task comprises sample buffer format conversion.

18. The non-transitory computer accessible storage medium as recited in claim 15 wherein the at least one first task comprises buffer size matching.

19. The non-transitory computer accessible storage medium as recited in claim 15 wherein the at least one first task comprises sample rate conversion.

20. The non-transitory computer accessible storage medium as recited in claim 15 wherein packetizing the preprocessed multi-channel digital audio stream comprises interleaving samples from a given channel of the multi-channel digital audio stream across multiple packets to provide redundancy in case of packet loss.

\* \* \* \* \*